United States Patent [19]

Kim

[11] Patent Number: 5,758,830

[45] Date of Patent: Jun. 2, 1998

[54] APPARATUS FOR CONTROLLING SUPPLY AMOUNT OF PHOTORESIST

[75] Inventor: Myoung Ho Kim, Kyungsangbook-Do, Rep. of Korea

[73] Assignee: LG Semicon Co., Ltd., Cheongju, Rep. of Korea

[21] Appl. No.: 550,727

[22] Filed: Oct. 31, 1995

[30] Foreign Application Priority Data

Mar. 11, 1994 [KR] Rep. of Korea ............... 1994/28788

[51] Int. Cl.[6] ............................................. F16K 31/06
[52] U.S. Cl. .............................. 239/585.5; 239/585.4; 239/585.1; 239/583; 251/129.18
[58] Field of Search ........................ 239/585.1, 585.2, 239/585.4, 585.5, 533.1, 533.15, 583, 584, 569, 533.3, 533.6, 533.9; 251/129.18

[56] References Cited

U.S. PATENT DOCUMENTS

| | | | |
|---|---|---|---|
| 2,587,538 | 2/1952 | Seaman | 251/129.18 |
| 2,820,604 | 1/1958 | Ray | 251/129.18 |
| 3,791,591 | 2/1974 | Hedges | 239/533.6 |
| 4,136,829 | 1/1979 | Kanao | 239/533.1 |
| 4,307,752 | 12/1981 | Inada et al. | 137/625.48 |
| 4,771,984 | 9/1988 | Szablewski et al. | 251/129.18 |
| 4,783,009 | 11/1988 | Coates | 251/129.18 |
| 5,029,568 | 7/1991 | Perr | 239/88 |
| 5,044,563 | 9/1991 | Mesenich | 251/129.18 |
| 5,074,326 | 12/1991 | Baker et al. | 137/15 X |
| 5,232,167 | 8/1993 | McCormick et al. | 239/585.5 |
| 5,263,648 | 11/1993 | Vogt et al. | 239/585.4 |
| 5,277,400 | 1/1994 | Bierther | 251/129.18 |
| 5,299,776 | 4/1994 | Brinn, Jr. et al. | 251/129.18 |
| 5,301,921 | 4/1994 | Kumar | 251/129.18 |
| 5,424,704 | 6/1995 | Dolle | 335/298 |
| 5,503,366 | 4/1996 | Zabeck et al. | 251/129.18 |

*Primary Examiner*—Andres Kashnikow
*Assistant Examiner*—Lisa Ann Douglas
*Attorney, Agent, or Firm*—Fleshner & Kim

[57] ABSTRACT

A photoresist supply amount controller is disclosed including: a connection pipe into which solution comes; a nozzle portion connected to one end of the connection pipe, the nozzle portion being hollow therein and made of electrically conductive material, the nozzle portion having a nozzle ball at its bottom; a core member installed to be raised or lowered in the nozzle portion, the core member being inserted in a tight contact with the inner circumference of the nozzle portion in order to selectively open and close the nozzle ball, the core member being made of electrically conductive material; a cylindrical electronic coil coupled to the outer circumference of the nozzle portion; a grip installed to penetrate the top center of the nozzle portion and having a spiral on its outer circumference.

5 Claims, 2 Drawing Sheets

5,758,830

APPARATUS FOR CONTROLLING SUPPLY AMOUNT OF PHOTORESIST

BACKGROUND OF THE INVENTION

The present invention relates to an apparatus for controlling the supply amount of photoresist, and more particularly, to an apparatus for controlling the supply amount of photoresist which, in using a nozzle, i.e., a coating device used in semiconductor equipment in order to spray photoresist, accurately controls the pressure and amount of the sprayed photoresist, and minimizes the leakage of the photoresist left in the nozzle.

Referring to FIG. 1, a conventional photoresist supplying apparatus is constructed in such a manner that a container 1 having photoresist therein is connected to a pump 3 through a first connection pipe 2. One side of pump 3 is connected to an air pressure control valve 4. A second connection pipe 5 having an intermediate valve 6 at a predetermined position is coupled to the outlet of pump 3. A nozzle 7 for discharging the photoresist is given to the end of second connection pipe 5. Reference numeral 8 indicates a piston. Reference numeral 9 is a pump spring.

The operation of the conventional photoresist supplying apparatus constructed as above will be described below.

When the photoresist retained in container 1 enters pump 3 through first connection pipe 2, it is compressed by pump 3 and carried to second connection pipe 5. Here, the spraying pressure and amount of the photoresist supplied to nozzle 7 are controlled by air pressure control valve 4 installed on one side of pump 3.

Continuously, when the photoresist comes into second connection pipe 5, intermediate valve 6 is opened so that the photoresist is sprayed through nozzle 7 provided at the end of second connection pipe 5. Through this step, a semiconductor equipment is coated.

Meanwhile, in order to stop spraying the photoresist, air pressure control valve 4 and intermediate valve 6 are closed. Here, as shown in FIG. 1, piston 8 installed in pump 3 is lowered by its own weight so that the solution contained in second connection pipe 5 flows backward to pump 3. This prevents the solution from being leakaged.

In the conventional photoresist supply amount controller, however, the sprayed amount of solution is carried out only by the air pressure control valve which is far away from the nozzle. This makes the sprayed amount difficult to accurately control. Even with the intermediate valve which can withdraw the residual photoresist solution, there is a problem in collecting the solution because the sprayed amount of solution is not controlled at the end of the nozzle.

SUMMARY OF THE INVENTION

Therefore, it is an object of the present invention to provide an apparatus for controlling the supply amount of photoresist, which is able to control the pressure and amount of sprayed solution at the final point of a target, to thereby accurately control the pressure and amount of the sprayed solution, and at the same time, to minimize the leakage of the photoresist left in a nozzle after operation.

To accomplish the object of the present invention, there is provided a photoresist supply amount controller comprising: a connection pipe into which solution comes; a nozzle portion connected to one end of the connection pipe, the nozzle portion being hollow therein and made of electrically conductive material, the nozzle portion having a nozzle ball at its bottom; a core member installed to be raised or lowered in the nozzle portion, the core member being inserted in a tight contact with the inner circumference of the nozzle portion in order to selectively open and close the nozzle ball, the core member being made of electrically conductive material; a cylindrical electronic coil coupled to the outer circumference of the nozzle portion; a grip installed to penetrate the top center of the nozzle portion and having a spiral on its outer circumference, whereby after the rising range of the core member is established by controlling the grip to thereby limit the maximum rising height of the core member, power is applied to the electronic coil so that he core member is raised or lowered in the nozzle portion according to Fleming's left hand law in order to control the pressure and amount of solution sprayed through the nozzle ball.

BRIEF DESCRIPTION OF THE ATTACHED DRAWINGS

DETAILED DESCRIPTION OF THE INVENTION

Hereinafter, a preferred embodiment of the present invention will be described below with reference to the attached drawings.

Figure 1:
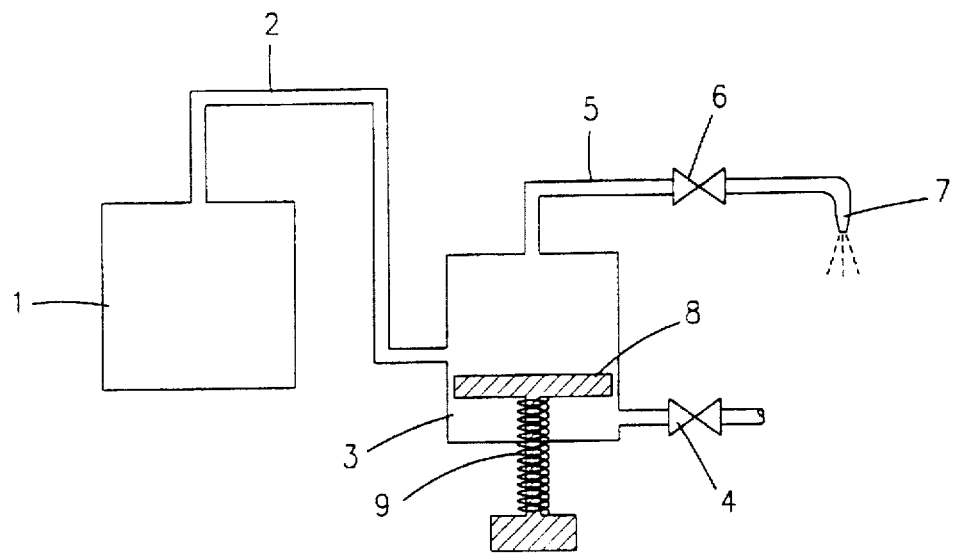
FIG. 1 is a schematic sectional view of a conventional photoresist spraying apparatus.
Figure 2:
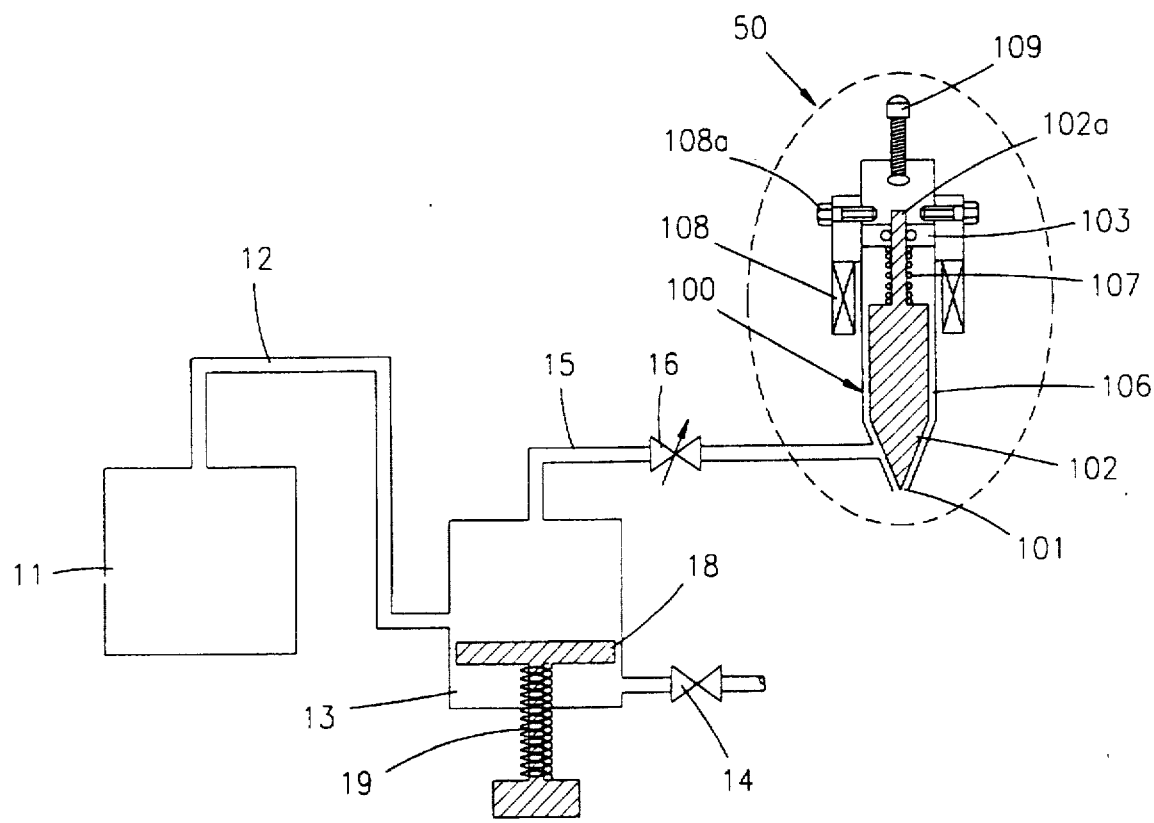
FIG. 2 is a sectional view of one embodiment of a photoresist supply amount controller of the present invention.
Figure 3:
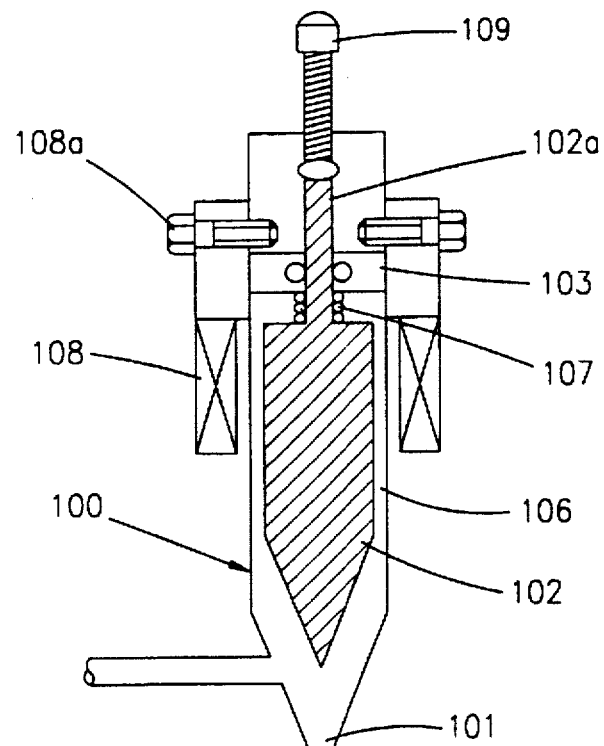
FIG. 3 is a sectional view showing the coupling of a support member and O-ring in the embodiment of the present invention.

Referring to FIG. 2, a photoresist supplying apparatus of the present invention is made in such a manner that a container 11 having photoresist therein is connected to a pump 13 through a first connection pipe 12. One side of pump 13 is connected to an air pressure control valve 14. A second connection pipe 15 having an intermediate valve 16 at a predetermined position is coupled to the outlet of pump 13. A spraying device 50 for controlling the sprayed amount is given to the end of second connection pipe 15 to communicate therewith. Reference numeral 18 indicates a piston. Reference numeral 19 is a pump spring.

The configuration of spraying device 50 will be explained in detail. First, a nozzle portion 100 is provided vertically. This nozzle portion made of electrically conductive material is hollow therein, and cylindrical at the top and conic at the bottom, having a nozzle ball 101 at the bottom. Here, one end of second connection pipe 15 communicates with one side of the inclined portion of the conic bottom of nozzle portion 100.

Meanwhile, in the lower portion of hollow nozzle portion 100, a core member 102 is inserted in a tight contact with the inner circumference of nozzle portion 100 to be able to be raised or lowered inside nozzle portion 100 and to thereby selectively open or close nozzle ball 101. The core member having a similar shape to the nozzle portion is cylindrical lengthwise (shorter than the nozzle portion) at the top in the shape of a slim rod (hereinafter referred to as support rod 102a), and conic at the bottom. In addition, the core member is full and made of electrically conductive material.

On the outer circumference of support rod 102a, a hollow cylindrical support member 103 is fixed around the inner circumference of nozzle portion 100 while spaced apart from the top of core member 102 by a predetermined distance.

Figure 4:
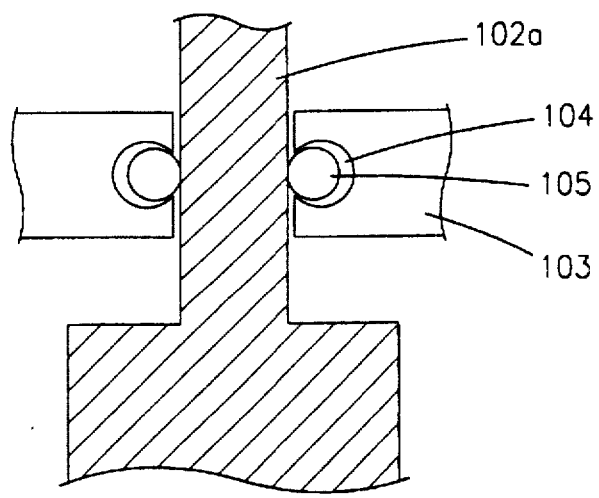
FIG. 4 is a sectional view in which a core member is raised in the embodiment of the photoresist supply amount controller of the present invention.

Referring to FIG. 4, on the inner circumference of support member 103, a circular recess 104 having a predetermined width is formed into which a rubber O-ring 105 is inserted to be in elastic contact with the outer circumference of support rod 102a.

The outer circumference of support rod 102a is in contact with the outer circumference of support member 103 not directly but via elastic O-ring 105 so that the solution raised through gap 106 provided between the inner circumference of nozzle portion 100 and the outer circumference of core member 102 is prevented from being leakaged. Here, a spring 107 is given on the outer circumference of support rod 102a placed between the bottom of support member 103 and the top of core member 102.

A cylindrical electronic coil 108 (solenoid coil) is fixedly coupled to the outer surface of core member 102 by a fastening member 108a while inserted into the outer circumference of nozzle portion 100 so that when power is applied to electronic coil 108, core member 102 is raised according to Fleming's left hand law. FIG. 4 is a sectional view in which core member 102 is raised.

A height controlling grip 109 with a spiral formed on its outer circumference is installed to penetrate the top center of nozzle portion 100. By turning height controlling grip 109 clockwise or counterclockwise, the range of raising core member 102 is limited to control the range of up and down movement of core member 102.

The operation and effect of the photoresist supplying apparatus constructed as above of the present invention will be described below.

When the photoresist enters nozzle portion 100 after passing through intermediate valve 16 and the communication portion of second connection pipe 15 and nozzle portion 100, an operation voltage is supplied to electronic coil 108 surrounding the outer circumference of nozzle portion 100 so that core member 102a is raised according to the Fleming's left hand law until the top of support rod 102a reaches the bottom of grip 109. Then, the photoresist solution is sprayed to nozzle ball 101 formed in nozzle portion 100.

The pressure and amount of the photoresist sprayed can be finely controlled by turning grip 109 in order to limit the rising range of core member 102, and by communicating one end of second connection pipe 15 with one side of the conic inclined portion formed at the bottom of nozzle portion 100.

Here, when the voltage is supplied to electronic coil 108 to raise core member 102 or grip 109 is turned in a direction in which the solution is discharged more, spring 107 is compressed to have an elastic force.

Meanwhile, in order to stop spraying the photoresist, the supply of the operation voltage to electronic coil 108 is interrupted and at the same time air pressure control valve 14 and intermediate valve 16 are closed. Therefore, core member 102 is lowered faster due to the elastic force of compressed spring 107 in addition to its own weight, as mentioned above. By doing so, the communication portion of second connection pipe 15 and nozzle portion 100 and nozzle ball 101 formed at the bottom of nozzle portion 100 are closed, and simultaneously, as shown in FIG. 2, piston 18 installed in pump 13 is lowered by its own weight so that the solution contained in second connection pipe 15 flows backward to pump 13. This prevents the solution from being leakaged.

As described above, the photoresist supply amount controller of the present invention is constructed to control the pressure and amount of sprayed solution at the final spraying point of a nozzle. Accordingly, the present invention can finely control the pressure and amount of the solution. In addition, the collection of residual solution is performed by the intermediate valve and the controller of the present invention, minimizing the leakage of the solution.

What is claimed is:

1. A device for spraying photoresist solution onto a semiconductor device comprising:

a nozzle portion connected to receive the photoresist solution, said nozzle portion being hollow therein and made of electrically conductive material, said nozzle portion having a nozzle ball at its bottom, and inside said nozzle portion, a hollow cylinder support member having a circular recess at its inner circumference is fixed around an inner circumference of said nozzle portion spaced apart from a top of said core member by a predetermined distance, and a rubber O-ring is inserted into said recess in order to be in elastic contact with a top outer circumference of said core member in a shape of a slim rod;

a core member installed to be raised or lowered in said nozzle portion, said core member being inserted in a tight contact with the inner circumference of said nozzle portion in order to selectively open and close said nozzle ball, said core member being made of electrically conductive material;

a cylindrical electronic coil coupled to the outer circumference of said nozzle portion;

a grip installed to penetrate the top center of said nozzle portion and having a spiral on its outer circumference, whereby after the rising range of said core member is established by controlling said grip to thereby limit the maximum rising height of said core member, power is applied to said electronic coil so that said core member is raised or lowered in said nozzle portion according to Fleming's left hand law in order to control the pressure and amount of photoresist solution sprayed through said nozzle ball onto the semiconductor device.

2. The device of claim 1, wherein said nozzle portion is cylindrical at the top and conic at the bottom.

3. The device of in claim 1, wherein said core member is cylindrical lengthwise in a shape of a slim rod at its top, and conic at its bottom, said core member being full and made of electrically conductive material.

4. The device of claim 1, wherein the photoresist solution is provided through one side of the inclined portion of the conic bottom of said nozzle portion.

5. The device of claim 1, further comprising a spring is provided at the top outer circumference of said core member having the slim rod placed between the bottom of said support member and the top of said core member.

* * * * *

UNITED STATES PATENT AND TRADEMARK OFFICE
CERTIFICATE OF CORRECTION

PATENT NO : 5,758,830
DATED : June 2, 1998
INVENTOR(S): Myoung Ho Kim

It is certified that error appears in the above-identified patent and that said Letters Patent are hereby corrected as shown below:

On the title page, item:

[30] Foreign Application Priority Data change "Mar. 11, 1994" to --November 3, 1994--.

Signed and Sealed this

Thirtieth Day of May, 2000

Q. TODD DICKINSON

*Attest:*

*Attesting Officer*          *Director of Patents and Trademarks*